US012420961B2

(12) United States Patent
Jeong et al.

(10) Patent No.: US 12,420,961 B2
(45) Date of Patent: Sep. 23, 2025

(54) DRONE STATION

(71) Applicant: ARGOSDYNE CO., LTD., Gyeonggi-do (KR)

(72) Inventors: Seung Ho Jeong, Seongnam-si (KR); Seung Hyun Jung, Seongnam-si (KR)

(73) Assignee: ARGOSDYNE CO., LTD., Yongin-si (KR)

(*) Notice: Subject to any disclaimer, the term of this patent is extended or adjusted under 35 U.S.C. 154(b) by 0 days.

(21) Appl. No.: 18/576,267

(22) PCT Filed: Nov. 29, 2021

(86) PCT No.: PCT/KR2021/017689
§ 371 (c)(1),
(2) Date: Aug. 13, 2024

(87) PCT Pub. No.: WO2023/282402
PCT Pub. Date: Jan. 12, 2023

(65) Prior Publication Data
US 2025/0153872 A1 May 15, 2025

(30) Foreign Application Priority Data
Jul. 5, 2021 (KR) .................. 10-2021-0087690

(51) Int. Cl.
*B64U 70/00* (2023.01)
*B64U 80/25* (2023.01)
*B64U 80/70* (2023.01)

(52) U.S. Cl.
CPC ............. *B64U 70/00* (2023.01); *B64U 80/25* (2023.01); *B64U 80/70* (2023.01)

(58) Field of Classification Search
CPC .......... B64U 80/25; B64U 80/70; B64F 1/005
See application file for complete search history.

(56) References Cited

U.S. PATENT DOCUMENTS 3,229,649 A * 1/1966 Baker ................. E04H 9/10
 109/1 R
3,253,806 A * 5/1966 Eickmann ............. B64C 27/12
 244/17.23

(Continued)

FOREIGN PATENT DOCUMENTS

CN 211818415 U 10/2020
KR 10-2019-0037646 A 4/2019

(Continued)

OTHER PUBLICATIONS

ARGOSDYNE. Youtube [online] [video]. May 3, 2021, non-official translation (Fixed Auto-Charging Station Demonstration Video). [retrieved on Feb. 24, 2022]. Retrieved from <https://www.youtube.com/watch?v=JkTdv9HTcrk&t=55s>.

*Primary Examiner* — Medhat Badawi
(74) *Attorney, Agent, or Firm* — Bridgeway IP Law Group, PLLC; Sang Ho Lee; Hyun Woo Shin

(57) ABSTRACT

A drone station according to an embodiment of the present invention may comprise: a station main body (10) having, mounted thereon, a charging device (20) allowing a drone to land thereon so as to be charged with drone power; a cover (30) provided at the station main body (10) so as to open/close the charging device (20) while rotating around an axle (12); and a window panel (34) provided in the cover (30), and made of a nonconductor material to transmit a GPS signal therethrough.

4 Claims, 6 Drawing Sheets

(56) References Cited

U.S. PATENT DOCUMENTS

| | | | | |
|---|---|---|---|---|
| 3,352,596 A * | 11/1967 | Escoto | B60P 3/34 | |
| | | | D12/104 | |
| 3,483,696 A * | 12/1969 | Ronald | B64C 27/08 | |
| | | | 416/157 R | |
| 4,255,911 A * | 3/1981 | Beacom | E04H 6/44 | |
| | | | 52/174 | |
| 4,262,712 A * | 4/1981 | Young | B67D 7/54 | |
| | | | 141/DIG. 1 | |
| 4,834,321 A * | 5/1989 | Granger | B64F 1/125 | |
| | | | 410/12 | |
| 5,533,616 A * | 7/1996 | Crowfoot | E04H 6/005 | |
| | | | 206/335 | |
| 5,950,372 A * | 9/1999 | Al-Sabah | F41H 5/24 | |
| | | | 89/1.8 | |
| 6,079,668 A * | 6/2000 | Brown | B64F 1/007 | |
| | | | 244/114 R | |
| 7,334,755 B2 * | 2/2008 | Svoboda, Jr. | B64C 27/08 | |
| | | | 244/17.23 | |
| 8,052,081 B2 * | 11/2011 | Olm | B64U 10/13 | |
| | | | 244/17.23 | |
| 8,245,469 B2 * | 8/2012 | Rubel | E04B 5/48 | |
| | | | 52/223.6 | |
| 8,256,172 B2 * | 9/2012 | Benson | E04F 15/02183 | |
| | | | 52/489.1 | |
| 8,297,552 B2 * | 10/2012 | Ying | B64F 1/007 | |
| | | | 244/114 R | |
| 8,511,606 B1 * | 8/2013 | Lutke | B64U 80/40 | |
| | | | 320/109 | |
| 8,622,066 B2 * | 1/2014 | Dolsby | E04H 15/008 | |
| | | | 52/64 | |
| 9,056,676 B1 * | 6/2015 | Wang | B64F 1/22 | |
| 9,126,693 B1 * | 9/2015 | Shi | B64U 10/14 | |
| 9,290,277 B2 * | 3/2016 | You | B64U 50/34 | |
| 9,296,492 B2 * | 3/2016 | Ying | B64F 1/222 | |
| 9,384,668 B2 * | 7/2016 | Raptopoulos | G06Q 10/083 | |
| 9,387,928 B1 * | 7/2016 | Gentry | B64U 50/39 | |
| 9,421,869 B1 * | 8/2016 | Ananthanarayanan | B60L 5/005 | |
| 9,429,953 B1 * | 8/2016 | Miller | G01S 19/01 | |
| 9,446,858 B2 * | 9/2016 | Hess | B64F 3/02 | |
| 9,457,899 B2 * | 10/2016 | Duffy | B64U 10/16 | |
| 9,527,605 B1 * | 12/2016 | Gentry | G05D 1/0094 | |
| 9,551,989 B2 * | 1/2017 | Scarlatti | G05D 1/00 | |
| 9,589,448 B1 * | 3/2017 | Schneider | F41H 9/10 | |
| 9,643,722 B1 * | 5/2017 | Myslinski | G05D 1/689 | |
| 9,718,564 B1 * | 8/2017 | Beckman | G08G 5/57 | |
| 9,783,075 B2 * | 10/2017 | Henry | G05D 1/654 | |
| 9,957,045 B1 * | 5/2018 | Daly | B64U 50/19 | |
| 9,959,773 B2 * | 5/2018 | Raptopoulos | G08G 5/57 | |
| 10,099,561 B1 * | 10/2018 | Ananthanarayanan | B60L 53/126 | |
| 10,099,785 B1 * | 10/2018 | Gonzalez | B64U 50/31 | |
| 10,176,722 B1 * | 1/2019 | Boyd | G08G 5/57 | |
| 10,268,208 B1 * | 4/2019 | Hopwood Thomas | G05D 1/0676 | |
| 10,310,501 B2 | 6/2019 | Greenberger | H02J 7/342 | |
| 10,434,885 B2 * | 10/2019 | Antonini | B64C 25/52 | |
| 10,467,685 B1 * | 11/2019 | Brisson | B64F 1/222 | |
| 10,526,094 B2 * | 1/2020 | Cheng | B64U 80/70 | |
| 10,719,080 B2 * | 7/2020 | Zhang | B64F 5/60 | |
| 10,745,102 B2 * | 8/2020 | Nysæter | B64U 30/20 | |
| D903,576 S * | 12/2020 | Feldman | D12/319 | |
| 10,934,019 B2 * | 3/2021 | Stamatovski | B64F 1/222 | |
| 10,967,970 B2 * | 4/2021 | Van Niekerk | B64U 30/293 | |
| D926,057 S * | 7/2021 | Moses | D10/70 | |
| 11,079,752 B1 * | 8/2021 | Lombardini | B64U 50/19 | |
| 11,111,033 B1 * | 9/2021 | Burks | B64U 50/34 | |
| D932,369 S * | 10/2021 | Passley | D12/16.1 | |
| 11,148,808 B2 * | 10/2021 | Wiggerich | B64U 30/26 | |
| D938,339 S * | 12/2021 | Baruchin | D12/345 | |
| 11,279,481 B2 * | 3/2022 | Burks | H04W 4/44 | |
| 11,370,561 B2 * | 6/2022 | Ratajczak | B66C 1/36 | |
| 11,636,771 B2 * | 4/2023 | Barker | B64U 50/39 | |
| | | | 701/16 | |
| 11,641,966 B2 * | 5/2023 | Nakanishi | A47G 29/124 | |
| | | | 232/44 | |
| 11,673,690 B2 * | 6/2023 | Dayan | B64U 80/70 | |
| | | | 244/114 R | |
| 11,710,092 B2 * | 7/2023 | Dearing | G07C 9/00896 | |
| | | | 705/330 | |
| 11,738,883 B2 * | 8/2023 | O'Toole | B60L 53/80 | |
| | | | 340/946 | |
| 11,741,422 B2 * | 8/2023 | Gil | B65G 1/0478 | |
| | | | 705/338 | |
| 11,780,606 B2 * | 10/2023 | Carthew | B64U 70/93 | |
| | | | 244/114 R | |
| 11,814,241 B2 * | 11/2023 | Tian | B60P 3/11 | |
| 11,939,057 B2 * | 3/2024 | Hamm | B64U 20/70 | |
| 11,939,080 B2 * | 3/2024 | Cowden | B64U 80/30 | |
| 12,131,656 B2 * | 10/2024 | Raptopoulos | G05D 1/104 | |
| 12,168,533 B1 * | 12/2024 | Hinman | B64U 70/97 | |
| 12,195,213 B2 * | 1/2025 | Qi | B64U 70/97 | |
| 12,214,902 B2 * | 2/2025 | Infanti | B64C 25/62 | |
| 2004/0256519 A1 * | 12/2004 | Ellis | B64F 1/125 | |
| | | | 244/110 E | |
| 2005/0061910 A1 * | 3/2005 | Wobben | B64C 29/00 | |
| | | | 244/17.23 | |
| 2005/0178894 A1 * | 8/2005 | McGeer | B64F 1/06 | |
| | | | 244/63 | |
| 2006/0038067 A1 * | 2/2006 | Dennis | B64U 70/50 | |
| | | | 244/63 | |
| 2006/0249622 A1 * | 11/2006 | Steele | B64U 70/30 | |
| | | | 244/115 | |
| 2007/0176432 A1 * | 8/2007 | Rolt | F03D 9/255 | |
| | | | 290/55 | |
| 2008/0217486 A1 * | 9/2008 | Colten | B64U 10/25 | |
| | | | 244/45 R | |
| 2009/0057486 A1 * | 3/2009 | Becht, IV | B64F 1/007 | |
| | | | 244/114 R | |
| 2010/0140416 A1 * | 6/2010 | Ohanian, III | B64U 10/13 | |
| | | | 244/23 A | |
| 2010/0170993 A1 * | 7/2010 | Misegades | B64C 7/00 | |
| | | | 244/130 | |
| 2010/0320313 A1 * | 12/2010 | Hanafin | B64F 1/125 | |
| | | | 244/114 R | |
| 2011/0174925 A1 * | 7/2011 | Ying | B64F 1/005 | |
| | | | 701/16 | |
| 2012/0080556 A1 * | 4/2012 | Root, Jr. | B64F 1/06 | |
| | | | 73/170.28 | |
| 2013/0233964 A1 * | 9/2013 | Woodworth | B64U 10/60 | |
| | | | 244/175 | |
| 2014/0032034 A1 * | 1/2014 | Raptopoulos | G05D 1/695 | |
| | | | 701/25 | |
| 2014/0124621 A1 * | 5/2014 | Godzdanker | B64F 1/28 | |
| | | | 244/110 E | |
| 2014/0188435 A1 * | 7/2014 | Coombs | H04N 23/661 | |
| | | | 702/188 | |
| 2014/0257595 A1 * | 9/2014 | Tillmann | B64U 10/14 | |
| | | | 701/2 | |
| 2014/0319272 A1 * | 10/2014 | Casado | B60L 3/12 | |
| | | | 244/110 E | |
| 2015/0069968 A1 * | 3/2015 | Pounds | B60L 53/35 | |
| | | | 320/109 | |
| 2015/0123462 A1 * | 5/2015 | Kamradt | B67D 7/02 | |
| | | | 141/192 | |
| 2015/0158599 A1 * | 6/2015 | Sisko | B64F 1/20 | |
| | | | 244/114 R | |
| 2015/0175276 A1 * | 6/2015 | Koster | A47G 29/14 | |
| | | | 244/114 R | |
| 2015/0183528 A1 * | 7/2015 | Walsh | A47G 29/14 | |
| | | | 244/114 R | |
| 2015/0336669 A1 * | 11/2015 | Kantor | G01C 21/343 | |
| | | | 701/3 | |
| 2015/0336677 A1 * | 11/2015 | Smaoui | H02J 7/0045 | |
| | | | 320/109 | |
| 2015/0363843 A1 * | 12/2015 | Loppatto | G06Q 30/0283 | |
| | | | 705/330 | |

(56) References Cited

U.S. PATENT DOCUMENTS

| | | | |
|---|---|---|---|
| 2016/0001883 A1* | 1/2016 | Sanz | B64U 10/13 244/17.23 |
| 2016/0003637 A1* | 1/2016 | Andersen | G01C 21/362 701/519 |
| 2016/0011592 A1* | 1/2016 | Zhang | G05D 1/10 244/114 R |
| 2016/0023761 A1* | 1/2016 | McNally | G05D 1/0094 701/3 |
| 2016/0039541 A1* | 2/2016 | Beardsley | B60L 53/14 701/2 |
| 2016/0068264 A1* | 3/2016 | Ganesh | G08G 5/55 701/4 |
| 2016/0068265 A1* | 3/2016 | Hoareau | G06Q 10/08 701/3 |
| 2016/0101856 A1* | 4/2016 | Kohstall | G05D 1/0669 244/17.23 |
| 2016/0130000 A1* | 5/2016 | Rimanelli | B64U 20/50 244/2 |
| 2016/0131025 A1* | 5/2016 | Pekrul | F02B 53/10 123/205 |
| 2016/0144982 A1* | 5/2016 | Sugumaran | B64F 1/005 244/108 |
| 2016/0159496 A1* | 6/2016 | O'Toole | B64F 1/005 244/110 E |
| 2016/0185466 A1* | 6/2016 | Dreano, Jr. | G06Q 10/083 705/26.81 |
| 2016/0194959 A1* | 7/2016 | Pekrul | F01C 19/06 418/146 |
| 2016/0196756 A1* | 7/2016 | Prakash | B64U 70/95 701/3 |
| 2016/0200438 A1* | 7/2016 | Bokeno | G05D 1/102 244/2 |
| 2016/0207627 A1* | 7/2016 | Hoareau | B64D 1/02 |
| 2016/0229299 A1* | 8/2016 | Streett | B64F 1/222 |
| 2016/0244162 A1* | 8/2016 | Weller | B64U 10/13 |
| 2016/0257423 A1* | 9/2016 | Martin | B64U 50/34 |
| 2016/0257426 A1* | 9/2016 | Mozer | B64F 1/362 |
| 2016/0272317 A1* | 9/2016 | Cho | G08G 1/162 |
| 2016/0280371 A1* | 9/2016 | Canavor | H04W 4/029 |
| 2016/0286128 A1* | 9/2016 | Zhou | H04N 23/68 |
| 2016/0291445 A1* | 10/2016 | Fisher, Sr. | F16M 11/10 |
| 2016/0304198 A1* | 10/2016 | Jourdan | G08G 5/57 |
| 2016/0304217 A1* | 10/2016 | Fisher | G05D 1/0011 |
| 2016/0307448 A1* | 10/2016 | Salnikov | A01C 21/00 |
| 2016/0311329 A1* | 10/2016 | Rodriguez | B60L 58/18 |
| 2016/0340006 A1* | 11/2016 | Tang | B63C 9/01 |
| 2016/0340021 A1* | 11/2016 | Zhang | B64C 27/006 |
| 2016/0355261 A1* | 12/2016 | Chin | B64U 70/20 |
| 2016/0364989 A1* | 12/2016 | Speasl | G08G 5/57 |
| 2016/0378108 A1* | 12/2016 | Paczan | B64U 30/20 705/330 |
| 2017/0011333 A1 | 1/2017 | Greiner | G06K 7/10722 |
| 2017/0015415 A1* | 1/2017 | Chan | G06Q 30/04 |
| 2017/0021941 A1* | 1/2017 | Fisher | B64U 10/20 |
| 2017/0021942 A1* | 1/2017 | Fisher | B64U 70/80 |
| 2017/0023949 A1* | 1/2017 | Fisher | G08G 5/55 |
| 2017/0050749 A1* | 2/2017 | Pilskalns | B60L 53/14 |
| 2017/0073085 A1* | 3/2017 | Tremblay | A47G 29/141 |
| 2017/0081043 A1* | 3/2017 | Jones | B64C 37/02 |
| 2017/0096222 A1* | 4/2017 | Spinelli | B64U 80/25 |
| 2017/0117676 A1* | 4/2017 | James | B64U 70/90 |
| 2017/0121023 A1* | 5/2017 | High | B64D 9/00 |
| 2017/0129464 A1* | 5/2017 | Wang | H02J 7/0045 |
| 2017/0129603 A1* | 5/2017 | Raptopoulos | B64F 1/22 |
| 2017/0132558 A1* | 5/2017 | Perez | G06Q 10/083 |
| 2017/0137118 A1* | 5/2017 | Gentry | B64D 1/02 |
| 2017/0144776 A1* | 5/2017 | Fisher | B64U 10/25 |
| 2017/0158352 A1* | 6/2017 | Von Flotow | B64C 27/26 |
| 2017/0158353 A1* | 6/2017 | Schmick | B60L 53/12 |
| 2017/0174335 A1* | 6/2017 | Malloy | B64D 27/34 |
| 2017/0190443 A1* | 7/2017 | Fisher | B64F 1/005 |
| 2017/0203632 A1* | 7/2017 | Westendarp | B60H 1/00378 |
| 2017/0203857 A1* | 7/2017 | O'Toole | A47G 29/141 |
| 2017/0225782 A1* | 8/2017 | Kohstall | B64U 30/26 |
| 2017/0225799 A1* | 8/2017 | Selwyn | B64F 1/005 |
| 2017/0225801 A1* | 8/2017 | Bennett | B64U 70/90 |
| 2017/0225802 A1* | 8/2017 | Lussier | B64U 10/14 |
| 2017/0240291 A1* | 8/2017 | Kim | H01M 16/006 |
| 2017/0247120 A1* | 8/2017 | Miller | B64U 20/83 |
| 2017/0253349 A1* | 9/2017 | Wang | B64U 70/97 |
| 2017/0270314 A1* | 9/2017 | Tsybrovskyy | H04W 12/06 |
| 2017/0275025 A1* | 9/2017 | Johnson | B64F 1/362 |
| 2017/0283090 A1* | 10/2017 | Miller | B64U 70/97 |
| 2017/0305575 A1* | 10/2017 | Bash | B64F 1/32 |
| 2017/0308850 A1* | 10/2017 | Roush | G01C 21/343 |
| 2017/0316701 A1* | 11/2017 | Gil | B60P 3/11 |
| 2017/0323129 A1* | 11/2017 | Davidson | G05D 1/0234 |
| 2017/0327091 A1* | 11/2017 | Capizzo | H01M 10/30 |
| 2017/0341769 A1* | 11/2017 | Haberbusch | F17C 5/007 |
| 2018/0009549 A1* | 1/2018 | Sullivan | B64F 1/027 |
| 2018/0029723 A1* | 2/2018 | Krauss | B64U 50/37 |
| 2018/0039286 A1* | 2/2018 | Tirpak | B64U 80/25 |
| 2018/0044015 A1* | 2/2018 | Kim | B64D 27/24 |
| 2018/0053139 A1* | 2/2018 | Stoman | B64U 10/13 |
| 2018/0056794 A1* | 3/2018 | Kim | B60L 53/126 |
| 2018/0092345 A1* | 4/2018 | Okumura | F41G 7/2253 |
| 2018/0092484 A1* | 4/2018 | Lewis | G08G 5/54 |
| 2018/0105276 A1* | 4/2018 | Smith | B60H 1/262 |
| 2018/0105289 A1* | 4/2018 | Walsh | B60L 53/51 |
| 2018/0118340 A1* | 5/2018 | Russo | B64U 50/37 |
| 2018/0118374 A1* | 5/2018 | Lombardini | B64F 3/02 |
| 2018/0148170 A1* | 5/2018 | Stamatovski | B64U 80/25 |
| 2018/0170191 A1* | 6/2018 | Xing | B64F 1/005 |
| 2018/0194484 A1* | 7/2018 | Livieratos | F02B 41/04 |
| 2018/0196418 A1* | 7/2018 | Meier | G05D 1/0206 |
| 2018/0212446 A1* | 7/2018 | Cheng | B64U 80/25 |
| 2018/0233055 A1* | 8/2018 | Damnjanovic | G08G 5/57 |
| 2018/0237161 A1* | 8/2018 | Minnick | B64U 50/37 |
| 2018/0245365 A1* | 8/2018 | Wankewycz | B64U 10/13 |
| 2018/0265296 A1* | 9/2018 | Beckman | B64U 70/90 |
| 2018/0295327 A1* | 10/2018 | Yearwood | B25J 11/002 |
| 2018/0312276 A1* | 11/2018 | Miller | B64U 10/14 |
| 2018/0319496 A1* | 11/2018 | Zhang | B64U 20/50 |
| 2018/0327091 A1* | 11/2018 | Burks | B64U 50/13 |
| 2018/0352988 A1* | 12/2018 | Ortiz | A47G 29/20 |
| 2018/0354649 A1* | 12/2018 | Ortiz | G08B 13/1436 |
| 2018/0357910 A1* | 12/2018 | Hobbs | B64C 27/00 |
| 2018/0364740 A1* | 12/2018 | Collins | G05D 1/0088 |
| 2018/0370618 A1* | 12/2018 | Harris | B64C 25/24 |
| 2019/0002127 A1* | 1/2019 | Straus | B64F 1/362 |
| 2019/0009926 A1* | 1/2019 | Hu | B64U 70/99 |
| 2019/0016476 A1* | 1/2019 | Scherz | H02J 7/0042 |
| 2019/0023133 A1* | 1/2019 | Renold | B60L 53/35 |
| 2019/0023416 A1* | 1/2019 | Borko | B66C 7/08 |
| 2019/0028904 A1* | 1/2019 | Carpenter | G08G 5/76 |
| 2019/0047462 A1* | 2/2019 | Vijayaraghavan | B60W 30/00 |
| 2019/0055018 A1* | 2/2019 | Bei | B64U 70/92 |
| 2019/0100108 A1* | 4/2019 | Davis | B64U 80/84 |
| 2019/0100313 A1* | 4/2019 | Campbell | B64U 10/14 |
| 2019/0100330 A1* | 4/2019 | Cheng | E04H 6/44 |
| 2019/0106224 A1* | 4/2019 | Nishikawa | B64F 1/228 |
| 2019/0108472 A1* | 4/2019 | Sweeney | G06Q 10/083 |
| 2019/0135403 A1* | 5/2019 | Perry | B64U 10/25 |
| 2019/0152326 A1* | 5/2019 | Nishikawa | B64U 50/19 |
| 2019/0161190 A1* | 5/2019 | Gil | E05F 15/77 |
| 2019/0217952 A1* | 7/2019 | Zawadzki | B64D 1/02 |
| 2019/0233103 A1* | 8/2019 | High | A47G 29/141 |
| 2019/0233107 A1* | 8/2019 | Tian | B64C 39/12 |
| 2019/0245365 A1* | 8/2019 | Farrahi Moghaddam | H02J 7/0042 |
| 2019/0256201 A1* | 8/2019 | Plekhanov | B64U 20/40 |
| 2019/0256202 A1* | 8/2019 | Resnick | B64U 50/19 |
| 2019/0256207 A1* | 8/2019 | Nohmi | G05D 1/0866 |
| 2019/0258910 A1* | 8/2019 | Stoman | G06K 19/06028 |
| 2019/0263519 A1* | 8/2019 | Argus | B64U 50/11 |
| 2019/0263538 A1* | 8/2019 | O'Brien | B64U 80/40 |
| 2019/0270526 A1* | 9/2019 | Hehn | B64U 80/70 |
| 2019/0283871 A1* | 9/2019 | Wieczorek | B64U 10/60 |
| 2019/0291961 A1* | 9/2019 | Urban | G06Q 50/40 |
| 2019/0308724 A1* | 10/2019 | Cooper | B64U 80/25 |
| 2019/0315235 A1* | 10/2019 | Kung | B64U 50/39 |
| 2019/0315463 A1* | 10/2019 | Chen | F24H 15/25 |

(56) References Cited

U.S. PATENT DOCUMENTS

| | | | | |
|---|---|---|---|---|
| 2019/0348862 A1* | 11/2019 | Obayashi | | H02J 50/90 |
| 2019/0383052 A1* | 12/2019 | Blake | | B64U 80/40 |
| 2020/0017218 A1* | 1/2020 | Ahmad | | B64D 9/00 |
| 2020/0017237 A1* | 1/2020 | Walker | | B64F 1/362 |
| 2020/0036243 A1* | 1/2020 | Zhao | | H02K 1/145 |
| 2020/0044463 A1* | 2/2020 | Kim | | B64U 10/14 |
| 2020/0055613 A1* | 2/2020 | Miller | | G05D 1/0676 |
| 2020/0062373 A1* | 2/2020 | Liao | | B64U 10/16 |
| 2020/0094957 A1* | 3/2020 | Sohmshetty | | B60P 3/11 |
| 2020/0148322 A1* | 5/2020 | Pekrul | | B63H 5/02 |
| 2020/0165008 A1* | 5/2020 | Krauss | | B64U 80/25 |
| 2020/0180940 A1* | 6/2020 | Rainville | | B64F 1/28 |
| 2020/0189731 A1* | 6/2020 | Mistry | | B64F 3/02 |
| 2020/0207484 A1* | 7/2020 | Foggia | | B64U 70/92 |
| 2020/0218287 A1* | 7/2020 | Wang | | B64U 50/34 |
| 2020/0218288 A1* | 7/2020 | Johnson | | B64U 30/26 |
| 2020/0225684 A1* | 7/2020 | Anderson | | B64U 70/95 |
| 2020/0239160 A1* | 7/2020 | Cheng | | B64F 1/22 |
| 2020/0247540 A1* | 8/2020 | Jones | | B64D 7/08 |
| 2020/0262583 A1* | 8/2020 | Ducharme | | B64U 70/97 |
| 2020/0290752 A1* | 9/2020 | Kolosiuk | | B64U 70/30 |
| 2020/0301445 A1* | 9/2020 | Jourdan | | G06K 19/06037 |
| 2020/0309489 A1* | 10/2020 | Kadavanich | | F41J 9/08 |
| 2020/0349852 A1* | 11/2020 | DiCosola | | G08G 5/55 |
| 2020/0369408 A1* | 11/2020 | Dolata | | B60L 53/16 |
| 2020/0398999 A1* | 12/2020 | Ortiz | | G07C 9/00309 |
| 2020/0406773 A1* | 12/2020 | Lacaze | | G05D 1/0094 |
| 2021/0031947 A1* | 2/2021 | Wankewycz | | B60L 53/36 |
| 2021/0045564 A1* | 2/2021 | Duckers | | E06B 3/483 |
| 2021/0047055 A1* | 2/2021 | Lee | | B64F 1/36 |
| 2021/0053677 A1* | 2/2021 | Passley | | B64U 70/95 |
| 2021/0070468 A1* | 3/2021 | Svirsky | | B64U 80/25 |
| 2021/0086913 A1* | 3/2021 | Friedman | | B64F 1/362 |
| 2021/0107684 A1* | 4/2021 | Le Lann | | B60L 53/52 |
| 2021/0122495 A1* | 4/2021 | Rezvani | | B64F 1/007 |
| 2021/0125503 A1* | 4/2021 | Henry | | G01S 13/89 |
| 2021/0237694 A1* | 8/2021 | Hirschvogel | | B60J 7/16 |
| 2021/0237899 A1* | 8/2021 | Warwick | | B64C 39/024 |
| 2021/0253242 A1* | 8/2021 | Falk-Petersen | | B64U 80/70 |
| 2021/0276735 A1* | 9/2021 | Raptopoulos | | A47G 29/141 |
| 2021/0284356 A1* | 9/2021 | Jourdan | | G08G 5/55 |
| 2021/0300591 A1* | 9/2021 | Tian | | B64F 1/007 |
| 2021/0354820 A1* | 11/2021 | Hiller | | B60L 53/12 |
| 2021/0394930 A1* | 12/2021 | O'Toole | | A47G 29/30 |
| 2022/0019247 A1* | 1/2022 | Dayan | | B64F 1/222 |
| 2022/0041279 A1* | 2/2022 | Rowse | | G05D 1/104 |
| 2022/0041299 A1* | 2/2022 | Wankewycz | | B64D 37/14 |
| 2022/0055770 A1* | 2/2022 | O'Toole | | B60L 53/80 |
| 2022/0073214 A1* | 3/2022 | Liske | | B64F 1/32 |
| 2022/0119105 A1* | 4/2022 | Schmalzried | | G05D 1/695 |
| 2022/0169401 A1* | 6/2022 | Di Cosola | | B64U 70/95 |
| 2022/0177130 A1* | 6/2022 | Burks | | B64U 50/13 |
| 2022/0234757 A1* | 7/2022 | Dayan | | B64U 80/70 |
| 2022/0242589 A1* | 8/2022 | Pham | | G09F 27/005 |
| 2022/0380063 A1* | 12/2022 | Shah | | B64F 1/362 |
| 2023/0023246 A1* | 1/2023 | McLaughlin | | G05D 1/0088 |
| 2023/0031028 A1* | 2/2023 | Ehasoo | | B64U 80/10 |
| 2023/0088830 A1* | 3/2023 | Kim | | B64U 70/50 |
| | | | | 244/221 |
| 2023/0100169 A1* | 3/2023 | Laczak | | A47G 29/141 |
| | | | | 232/1 R |
| 2023/0202682 A1* | 6/2023 | Kiyokami | | B64U 70/90 |
| | | | | 244/114 R |
| 2023/0202691 A1* | 6/2023 | Kiyokami | | B64U 80/86 |
| | | | | 244/114 R |
| 2024/0278946 A1* | 8/2024 | Roberts | | B64U 10/16 |
| 2024/0336378 A1* | 10/2024 | Neate | | B64U 70/50 |
| 2024/0391616 A1* | 11/2024 | Dayan | | B64U 70/90 |
| 2025/0002185 A1* | 1/2025 | Liu | | B64U 80/70 |
| 2025/0026509 A1* | 1/2025 | Infanti | | B64U 70/50 |

FOREIGN PATENT DOCUMENTS

| | | |
|---|---|---|
| KR | 10-2020-0032959 A | 3/2020 |
| KR | 10-2020-0088038 A | 7/2020 |
| KR | 10-2021-0066037 A | 6/2021 |

* cited by examiner

DRONE STATION

TECHNICAL FIELD

The present disclosure relates to a drone station capable of allowing a drone to land thereon and takeoff therefrom and of charging the drone with power in a landing state.

BACKGROUND ART

In general, a drone may include a main body, a motor, a rotating blade, a battery, and a control device. Further, the drone may be provided with a GPS signal receiver.

The drone may have various purposes such as agricultural, industrial, military, and the like. Regardless of the purpose, an area on which the drone lands and an area in which the drone performs actual work may be physically different from each other.

That is, the drone has to move in order to perform the purpose of use. In this case, after receiving the GPS signal and recognizing the position thereof based on the signal, the drone should move to the designated position or along the designated path.

A drone station may be an apparatus or a structure which the drone lands on or take off from. In a state in which the drone lands on the drone station, a battery of the drone may be replaced or may re-charged, and the drone may be subjected to maintenance work for other purposes.

A known drone station has a structure with an open top. However, the drone station having this structure is affected by external factors such as wind, rainwater, etc. When the drone station is affected by the external factors, a failure of the drone station may easily occur, and charging of the drone may not be smoothly performed due to a poor contact of a power terminal.

In addition, after the battery of the drone is charged at the drone station, the drone receives a GPS signal and recognizes the position thereof based on the signal for re-flight. Generally, a time taken for recognizing the GPS signal may be approximately several seconds to several minutes.

Therefore, for re-flight of the drone, it is necessary to reduce an initialization time.

DISCLOSURE

Technical Purpose

Therefore, a purpose of the present disclosure is to provide a drone station capable of allowing the drone to be recharged or subjected to maintenance work more safely so that the drone is protected from wind and rain, and of allowing the drone to recognize its location more quickly for re-flight, thereby significantly reducing a work processing speed.

Technical Solution

To achieve the technical purpose, a drone station according to an embodiment of the present disclosure comprises: a station body 10 having a charging device 20 mounted thereon, wherein a drone lands on the charging device 20 configured to charge a battery of the drone; a cover 30 including a frame 32 having a grid structure, wherein the cover has a fan shape in a side view, and is installed at the station body 10 and pivots around an axle 12 to open or close the charging device 20; and a window panel 34 installed in a grid-shaped space of the frame 32, and made of a non-conductive material such that a GPS signal transmits the window panel.

In one embodiment of the drone station, the cover 30 includes both covers respectively disposed at both opposing sides of the station body 10, wherein the both covers pivot around both axles 12, respectively to be brought into an opened or closed state.

In one embodiment of the drone station, the drone station further comprises a locking device 40 configured to maintain the closed state in which the both covers 30 are in contact with each other.

In one embodiment of the drone station, the drone station further comprises a sub-cover 50 formed in a fan shape in a side view, wherein the sub-cover 50 is disposed inwardly of the cover 30, and pivots about the axle 12 to be brought into an opened or closed state.

In one embodiment of the drone station, the window panel 34 is an acrylic panel or a glass panel.

In one embodiment of the drone station, a first rib 36 is formed at a lower edge of the cover 30, and a second rib 56 is formed at an upper edge of the sub-cover 50,
wherein when the cover 30 pivots to be brought into the closed state, the first rib 36 contacts the second rib 56 to allow the sub-cover 50 to pivot.

In one embodiment of the drone station, when the cover 30 pivots to be brought into the opened state, the cover initially pivots in a state in which the second rib 56 is seated on the first rib 36, wherein when the pivot movement of the sub-cover 50 has been completed, the first rib 36 is removed from the second rib 56 such that the cover 30 is able to pivot.

Specific details of other embodiments are included in the detailed description and

DRAWINGS

Technical Effect

As described above, the drone station according to the embodiment of the present disclosure configured as described above, the cover may be coupled to the station body so as to be opened or closed. The cover may be closed when the charging device charges the drone in the landing state to protect the drone and the charging device from rain, wind or the like.

In addition, even when the cover of the drone station according to the embodiment of the present disclosure is in a closed state, the drone may receive the GPS signal, and thus, the drone may recognize the position thereof based on the received signal. Thus, the drone may perform a mission in a state in which the drone has recognized the position thereof, thereby significantly reducing an exit time out of the drone station.

BEST MODE

Figure 1:
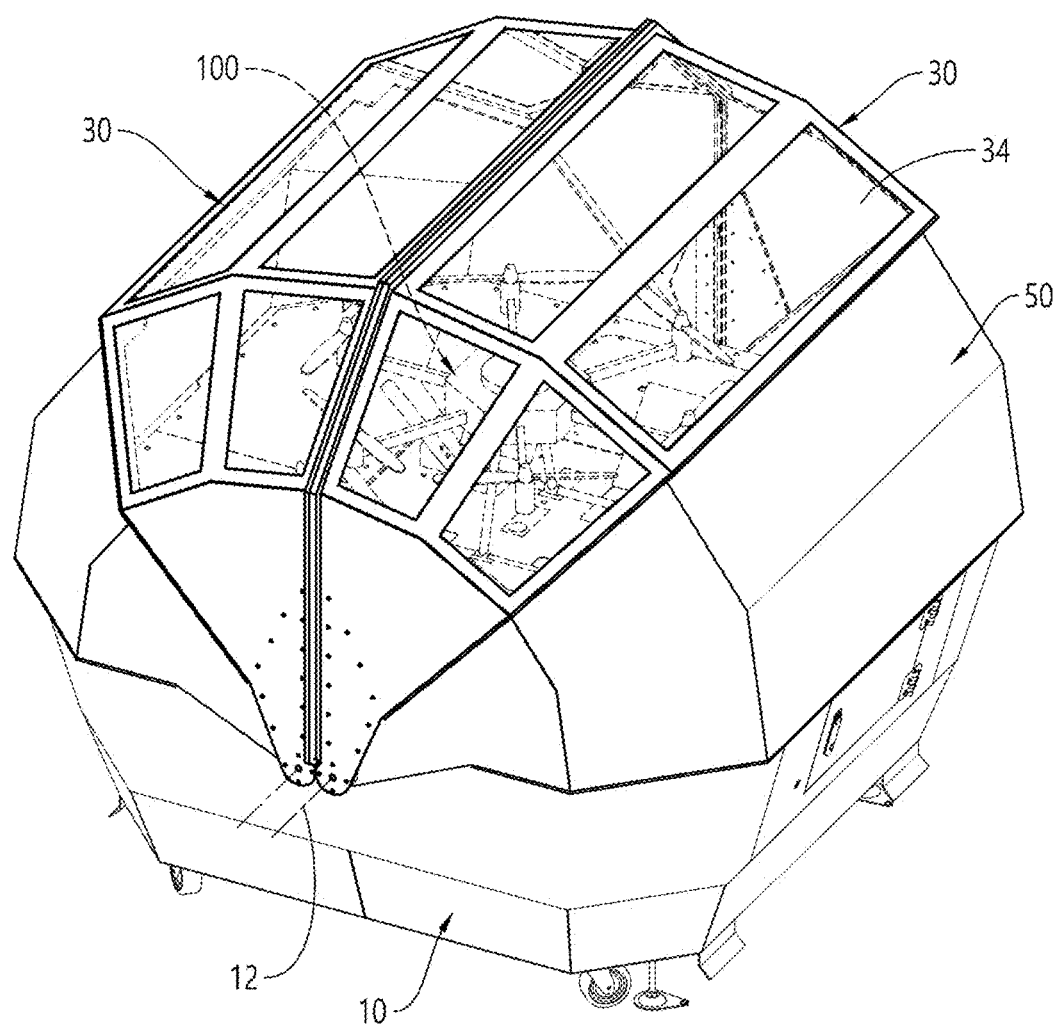
FIG. 1 is a diagram illustrating a drone station according to an embodiment of the present disclosure.

The advantages and features of the present disclosure, and methods of achieving them, will be apparent with reference to the embodiments described in detail below in conjunction with the accompanying drawings.

Hereinafter, embodiments of the present disclosure will be described in detail with reference to the accompanying drawings. It should be understood that the embodiments as described below are illustrative in order to facilitate understanding of the present disclosure, and it should be understood that the present disclosure may be variously modified differently from the embodiments as described herein. However, a detailed description of known functions or components will be omitted when it may make the gist of the present disclosure rather unclear. In addition, the accompanying drawings may not be shown as an actual scale to assist in understanding of the disclosure, but rather, some components may be shown to be exaggerated in size.

Further, the terms to be described below are set in consideration of the functions of the present disclosure, and may be changed depending on the intention or customary of a manufacturer, and thus the definition thereof should be made based on the contents throughout the disclosure.

Like reference numerals refer to like elements throughout the disclosure.

Figure 2:
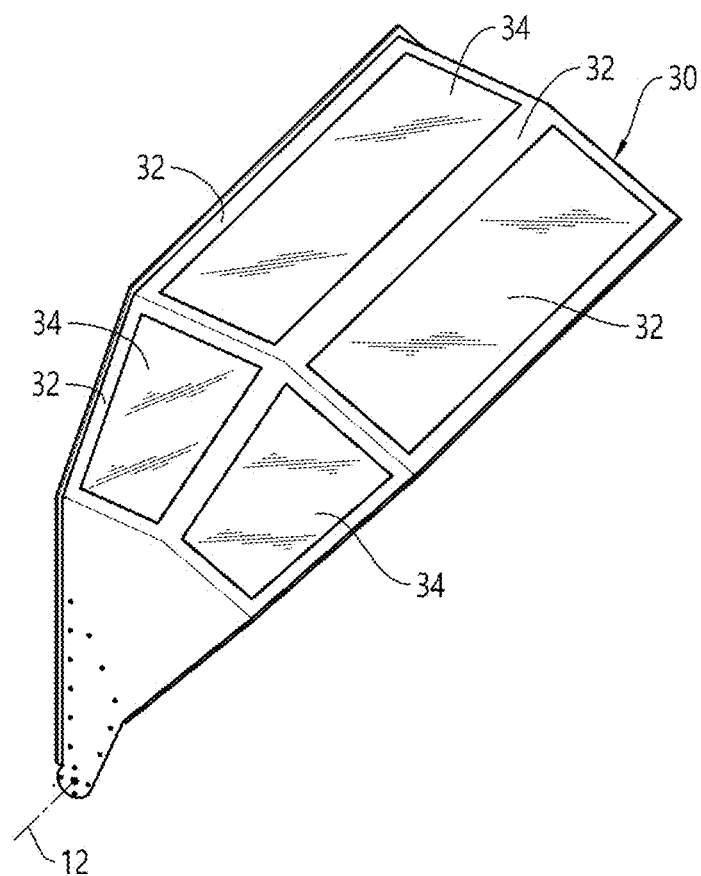
FIG. 2 is a diagram illustrating a cover in a drone station according to an embodiment of the present disclosure.
Figure 3:
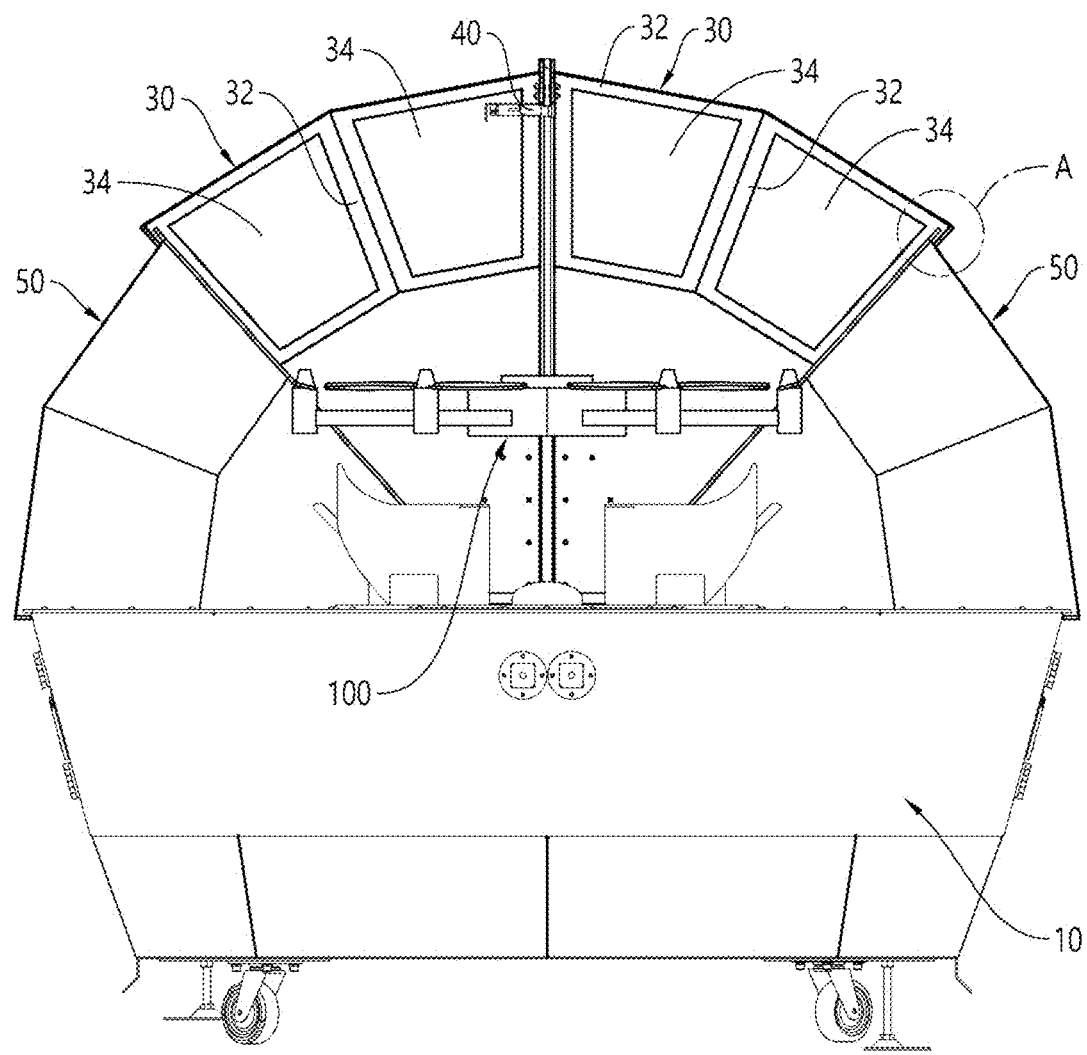
FIG. 3 is a cross-sectional view illustrating a state in which a drone is accommodated in a drone station according to an embodiment of the present disclosure.
Figure 4:
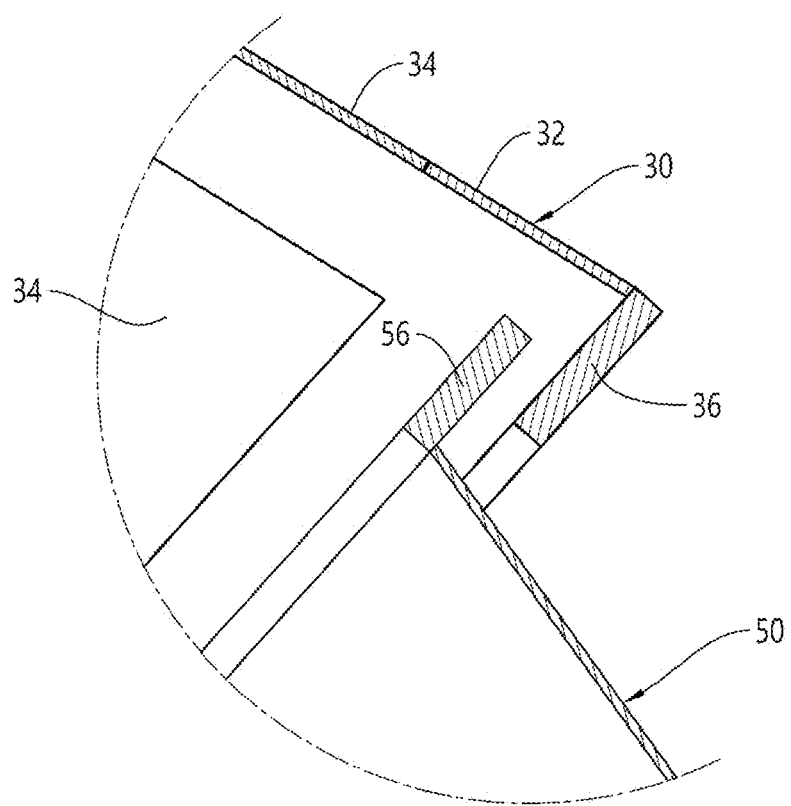
FIG. 4 is a detailed view of a portion A of FIG. 3.
Figure 5:
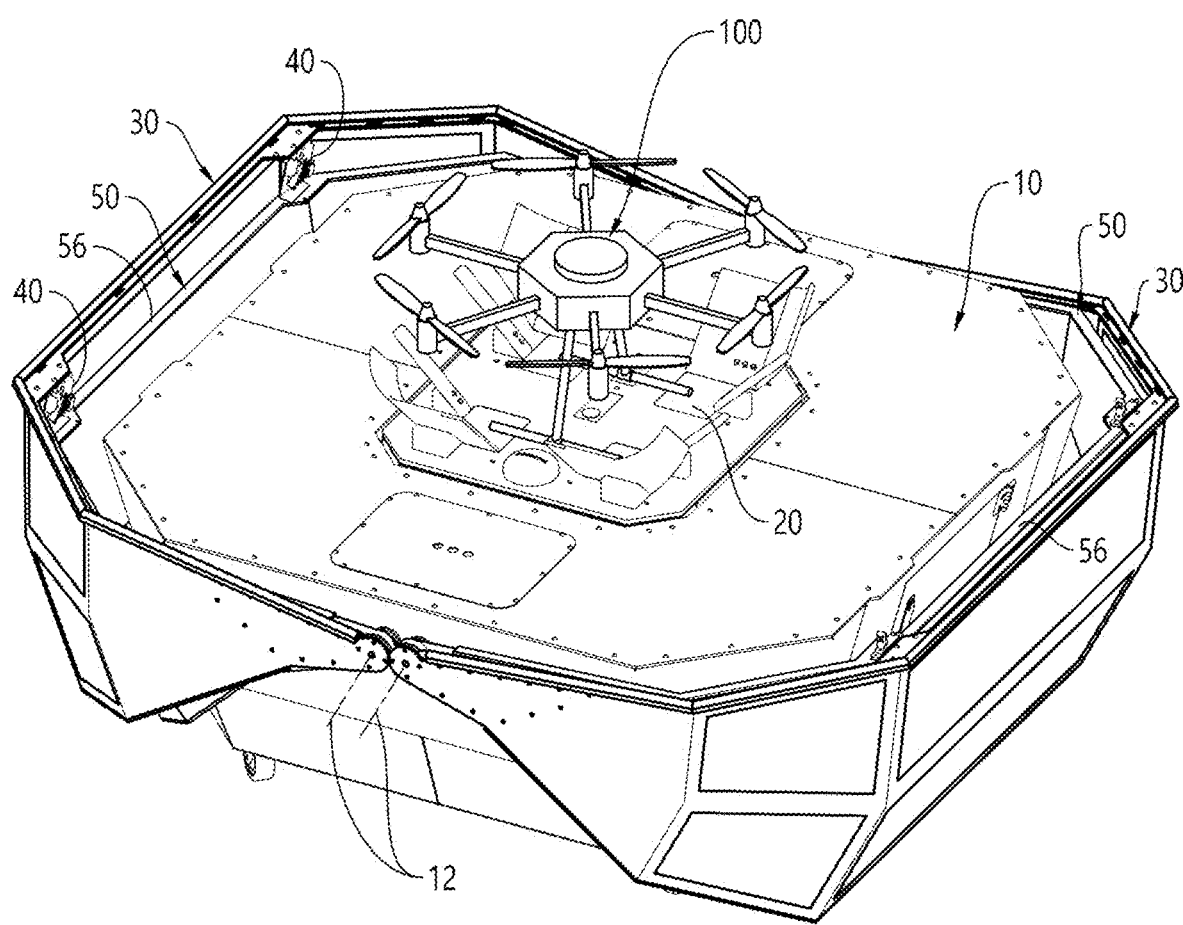
FIG. 5 is a view illustrating a state in which a cover is opened in a drone station according to an embodiment of the present disclosure.
Figure 6:
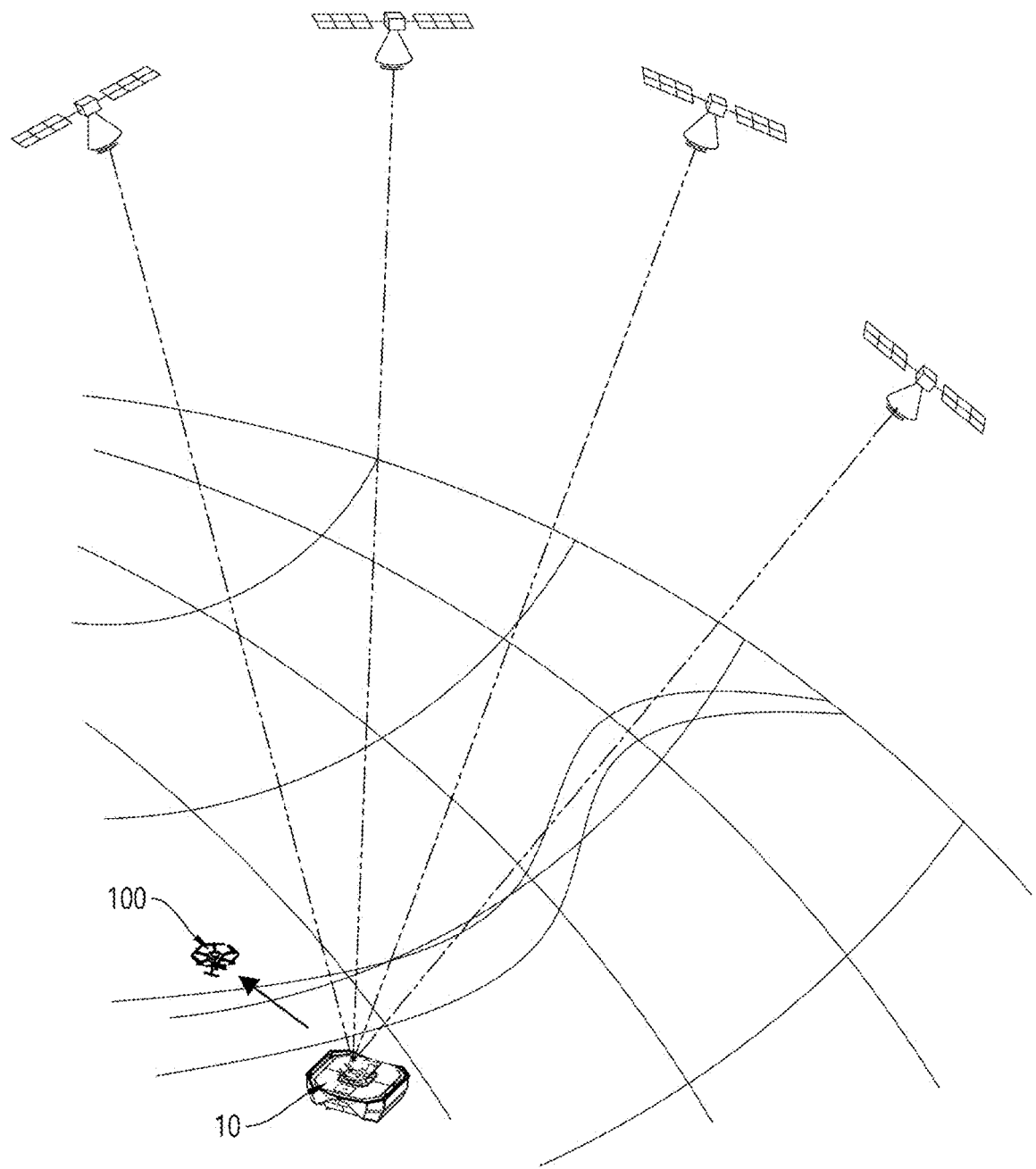
FIG. 6 is a diagram illustrating an example in which a drone exits out of a drone station according to an embodiment of the present disclosure.

Hereinafter, a drone station according to an embodiment of the present disclosure will be described with reference to FIGS. 1 to 6. FIG. 1 is a diagram illustrating a drone station according to an embodiment of the present disclosure. FIG. 2 is an illustration of a cover at a drone station in accordance with an embodiment of the present disclosure. FIG. 3 is a cross-sectional view illustrating a state in which a drone is accommodated in a drone station according to an embodiment of the present disclosure. FIG. 4 is a detailed view of a portion A of FIG. 3. FIG. 5 is a view illustrating a state in which a cover is opened in a drone station according to an embodiment of the present disclosure. FIG. 6 is a diagram illustrating an example in which a drone exits out of a drone station according to an embodiment of the present disclosure.

The drone station according to an embodiment of the present disclosure may include a station body 10, a cover 30, and a window panel 34.

The drone station has a charging device 20 mounted on a top of the station body 10. The drone lands on the charging device 20 on which the drone is charged by the charging device. When the drone 100 lands at a specific position in a designated posture, the charging device 20 may supply power to the drone 100 to charge the battery of the drone 100. The drone charging technology uses known techniques, and a detailed description thereof will be omitted.

As shown in FIGS. 1 to 5, the cover 30 may be installed in the station body 10, and may be coupled thereto via a shaft or the like and pivot about the axle 12 to open and close the charging device 20.

In addition, as shown in FIG. 2, a frame 32 may be provided in a grid structure, and the frame 32 may be made of a rigid material, for example, a metal material.

As shown in FIGS. 1 and 3, the cover 30 may be closed, and as shown in FIG. 5, the cover 30 may be opened.

The window panel 34 may be installed in the cover 30, as shown in FIGS. 1 and 2. More specifically, the window panel 34 may be disposed in a grid-shaped space of the frame 32 as shown in FIG. 2.

In addition, the window panel 34 may be made of a nonconductive material, and thus transmits a GPS signal therethrough.

As described above, in the drone station according to the embodiment of the present disclosure, the cover 30 may be coupled to the station body 10 so as to be opened or closed. The cover 30 may be closed when the charging device 20 charges the drone 100 in the landing state to protect the drone 100 and the charging device 20 from rain, wind or the like.

In addition, even when the cover 30 of the drone station according to the embodiment of the present disclosure is in a closed state, the drone 100 may receive the GPS signal, and thus, the drone 100 may recognize the position thereof based on the received signal. Thus, the drone 100 may perform a mission in a state in which the drone 100 has recognized the position thereof, thereby significantly reducing an exit time out of the drone station.

In addition, the cover 30 may be made of a rigid material to more stably support the window panel 34.

In one example, as shown in FIGS. 1, 3, and 5, the covers 30 may be respectively disposed at both opposing sides of the station body 10 so as to pivot around both axles 12, respectively, to move toward or away from each other. Accordingly, when the cover is opened or closed, a displacement of each of the covers 30 is reduced, and thus the cover 30 may be opened and closed more quickly.

In addition, as shown in FIG. 3, in the drone station according to the embodiment of the present disclosure, a locking device 40 may be installed at the cover 30. The locking device 40 may maintain the closed state in which one cover 30 is in contact with the other cover 30.

In addition, as illustrated in FIGS. 1 and 3, the drone station according to the embodiment of the present disclosure may include a sub-cover 50. The sub-cover 50 may be formed in a fan shape in a side view, may be disposed inwardly of the cover 30, and may be opened and closed while pivoting with respect to the axle 12.

As shown in FIGS. 3 and 4, the sub-cover 50 may extend so as to be connected to the cover 30. More specifically, a first rib 36 may be formed at a lower edge of the cover 30, and a second rib 56 may be formed at an upper edge of the sub-cover 50.

When the cover 30 pivots in a closing direction, the first rib 36 contacts the second rib 56 to allow the sub-cover 50 to pivot. Thus, the sub-cover 50 moves upwardly when the cover 30 is closed.

On the contrary, when the cover 30 pivots in the opening direction, the cover initially pivots in a state in which the second rib 56 seats on the first rib 36. As shown in FIG. 5, when the pivot movement of the sub-cover 50 has been completed, the first rib 36 may move away from the second rib 56 such that the cover 30 may pivot.

When the cover 30 is opened, the sub-cover 50 may pivot downwardly due to its own weight.

That is, in the drone station according to the embodiment of the present disclosure, the cover 30 is opened to entirely open a top of the station body 10 as shown in FIG. 5 to prevent the cover 30 from interfering with the drone 100 in the takeoff or landing state, and to allow a wide view angle of a drone operator to be secured.

In an example, the window panel 34 may be an acrylic panel or a glass panel. As a result, the GPS signal may easily transmit through the window panel 34, thereby allowing the drone 100 to more quickly recognize its position when the drone is initialized for re-flight.

As shown in FIG. 6, the location of the station body 10 and an area in which the drone 100 performs a mission may be different from each other. The drone 100 may receive the GPS signal from four satellites and calculate a position thereof, based on the received signal.

Thereafter, the drone 100 may fly according to a request of the drone operator and may move to a destination location or fly along a designated route, and may return to and land on the station body 10 after achieving the flight purpose.

Although the embodiments of the present disclosure have been described with reference to the accompanying drawings, the skilled person to the art appreciates that the present disclosure may be embodied in other specific forms without changing the technical spirit or essential features of the present disclosure.

Therefore, it should be understood that the embodiments described above are exemplary in all respects and are not restrictive, and the scope of the disclosure should be construed as being dependent on the claims to be described below, and all changes or modifications derived from the meaning and scope of the claims and their equivalents are intended to be included in the scope of the present disclosure.

INDUSTRIAL APPLICABILITY

The drone station according to the embodiment of the present disclosure may be used to allow the drone to land thereon or takeoff therefrom and charge the battery of the drone.

The invention claimed is:

1. A drone station comprising:
   a station body having a charging device, wherein a drone lands on the charging device configured to charge a battery of the drone;
   a cover including a frame having a grid structure, wherein the cover has a shape of a folding fan in a side view, and is installed at the station body and pivots around an axle to open or close the charging device;
   a window panel installed in a grid-shaped space of the frame, and made of a nonconductive material to allow transmission of a GPS signal through the window panel; and
   a sub-cover having a shape of a folding fan in a side view, wherein the sub-cover is disposed inwardly of the cover, and pivots around the axle to transition into an opened or closed state,
   wherein a first rib is formed at a lower edge of the cover, and a second rib is formed at an upper edge of the sub-cover,
   wherein, when the cover pivots and transitions into the closed state, the first rib contacts the second rib to allow the sub-cover to pivot,
   wherein, when the cover pivots and transitions into the opened state, the cover initially pivots in a state in which the second rib is seated on the first rib, and
   wherein, when the sub-cover completes pivoting, the first rib is removed from the second rib to allow the cover to pivot.

2. The drone station of claim 1, wherein the cover includes two covers respectively disposed at two opposing sides of the station body, wherein each of the two covers pivot around corresponding axles and transition into an opened or closed state.

3. The drone station of claim 2, further comprising a locking device configured to maintain the closed state in which the two covers are in contact with each other.

4. The drone station of claim 1, wherein the window panel is an acrylic panel or a glass panel.

* * * * *